United States Patent [19]
Wittkopp, Jr. et al.

[11] Patent Number: 5,697,693
[45] Date of Patent: Dec. 16, 1997

[54] SWITCH MOUNTING SYSTEM

[75] Inventors: Michael H. Wittkopp, Jr., Grand Haven; Christopher T. Nelson, Holland, both of Mich.

[73] Assignee: Prince Corporation, Holland, Mich.

[21] Appl. No.: 421,495

[22] Filed: Apr. 13, 1995

[51] Int. Cl.⁶ ........................................ B60Q 3/00
[52] U.S. Cl. .................. 362/74; 362/61; 362/833; 362/295
[58] Field of Search .................. 362/33, 80, 83.3, 362/74, 295, 394, 395

[56]                  References Cited

U.S. PATENT DOCUMENTS

| | | | |
|---|---|---|---|
| 2,272,688 | 2/1942 | Catron | 200/296 X |
| 4,715,569 | 12/1987 | Essig et al. | 248/27.1 |
| 4,892,987 | 1/1990 | Aframian | 200/296 |
| 5,143,331 | 9/1992 | Robert | 248/27.1 |
| 5,219,068 | 6/1993 | Piotrowski | 200/296 |
| 5,323,297 | 6/1994 | Palumbo et al. | 361/809 |
| 5,350,140 | 9/1994 | Ripley et al. | 248/27.1 |
| 5,442,530 | 8/1995 | Viertel et al. | 362/74 X |

*Primary Examiner*—Stephen F. Husar
*Attorney, Agent, or Firm*—Price, Heneveld, Cooper, DeWitt & Litton

[57]                    ABSTRACT

A switch mounting system includes a switch and housing structure and a method of assembling one to another. The housing has at least one keyed aperture for receiving a post of a switch body which is inserted into the keyed aperture and subsequently shifted into a final, aligned position during installation. The switch includes a switch actuator which is aligned with an aperture in the housing once shifted to the installed position. A switch actuating button is then extended through the aperture from the side opposite the housing from the switch body and locks onto the actuator member for locking the switch in the installed position.

33 Claims, 3 Drawing Sheets

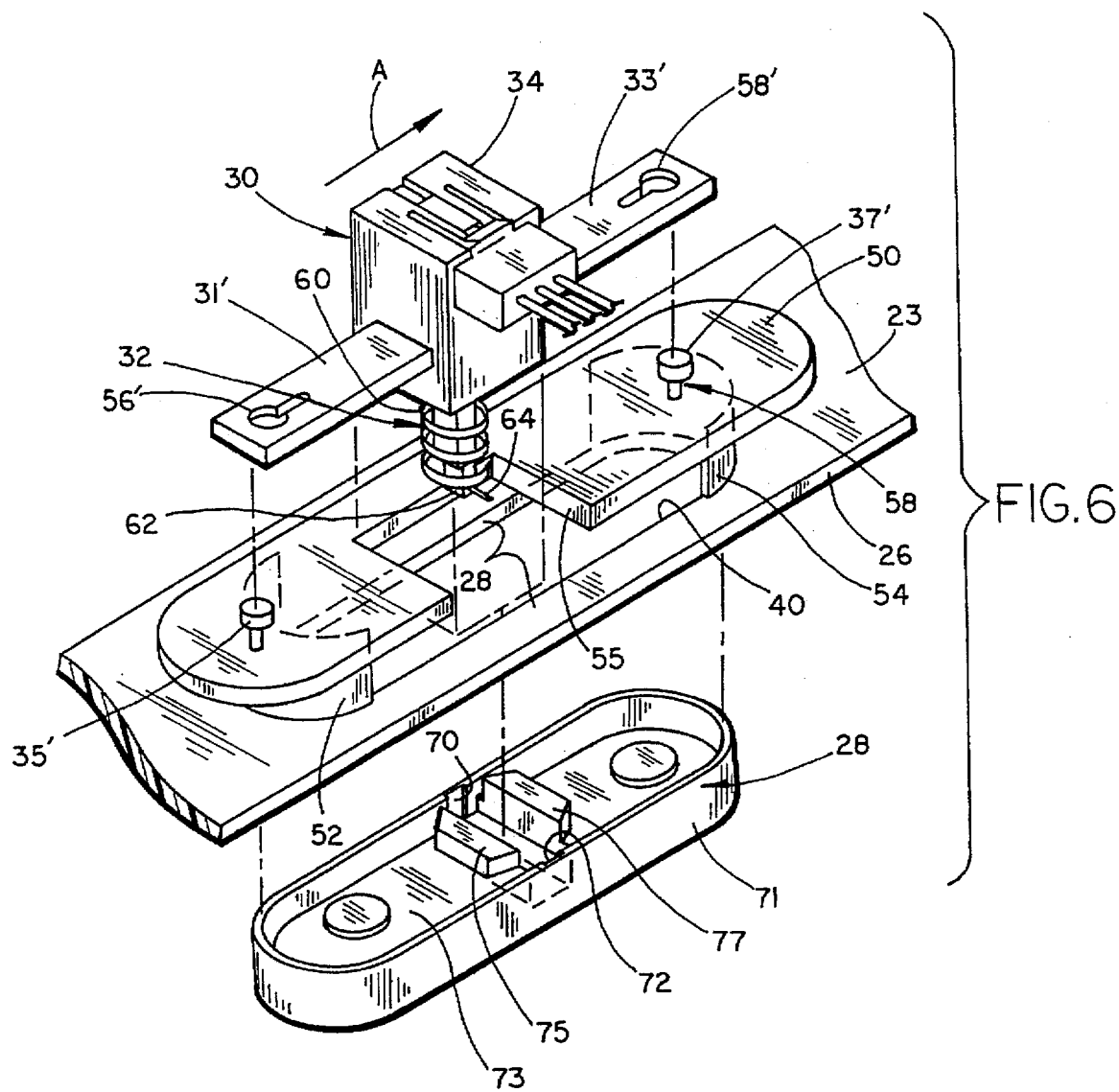

5,697,693

1

SWITCH MOUNTING SYSTEM

BACKGROUND OF THE INVENTION

The present invention relates to an electrical switch mounting system for a vehicle.

Switches used for controlling vehicle electrical accessories, such as map lamps and the like, typically are mounted to a vehicle housing by fastening means such as clips, fastening nuts over threaded barrels of push button switches, or other fastening structure which requires separate manufacturing steps as well as parts. The push button switches frequently employed in map lamps are mounted to a substrate and include a push-button actuating button which extends through a bezel typically located adjacent a lens behind which the lamp being actuated is located. A decorative snap-on button frequently is mounted to the switch to complete the assembly. The switch itself, however, is fastened to the substrate using separate fasteners as noted above.

Thus, it is desirable to provide a switch mounting system which eliminates additional fastening structure for mounting a switch to a vehicle housing as well as eliminate assembly steps during the process of manufacturing, for example, a map lamp assembly.

SUMMARY OF THE INVENTION

The switch mounting system of the present invention overcomes the problems of the prior art by eliminating separate fasteners and employing a switch body which cooperates with an accessory housing for locating and locking the switch into position in cooperation with a switch actuating member. The switch mounting system embodying the present invention includes a switch housing having at least one keyed aperture for receiving a post extending from the switch body and which is inserted into the keyed aperture and subsequently shifted into a final, aligned position during installation. The switch includes a switch actuator which is aligned with an aperture in the housing once shifted to the installed position and a switch actuating button extended through the aperture from the side opposite the housing from the switch body and snap locked onto the actuator member for locking the switch in the installed position. The switch mounting post, keyway and actuating button cooperate with the housing to allow the switch to be mounted to the housing without additional fastening structure or assembly procedures using the method of placing of the switch into the keyed aperture, shifting it into final position and installing the switch actuator button.

As a result, a less expensive and more easily assembled switch is provided for use in vehicles such as automobiles and particularly for use in accessories in vehicles, such as map lamps or the like. These and other features, objects and advantages of the present invention will become apparent upon reading the following description thereof together with reference to the accompanying drawings.

2

Figure 3:
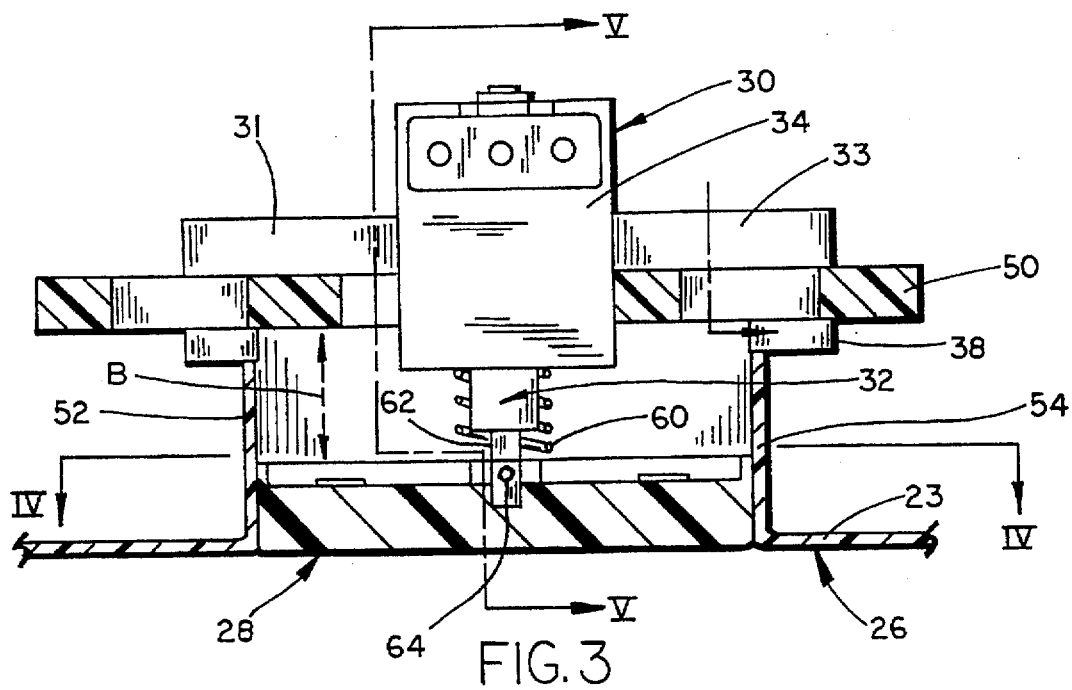
FIG. 3 is a cross-sectional view of the switch once assembled and taken along section lines III—III of FIG. 2.
Figure 4:
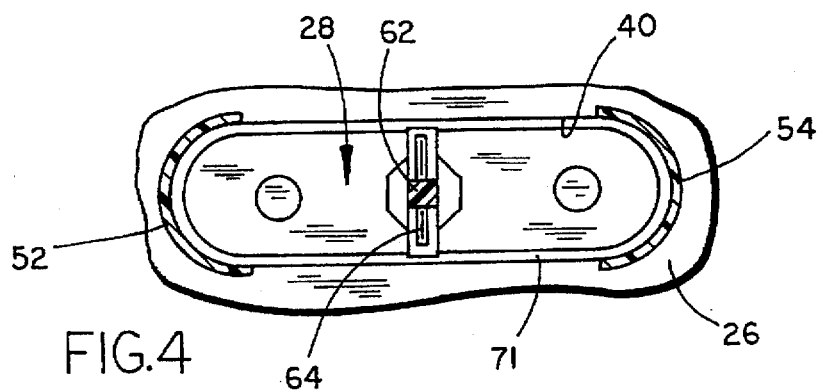
Figure 5:
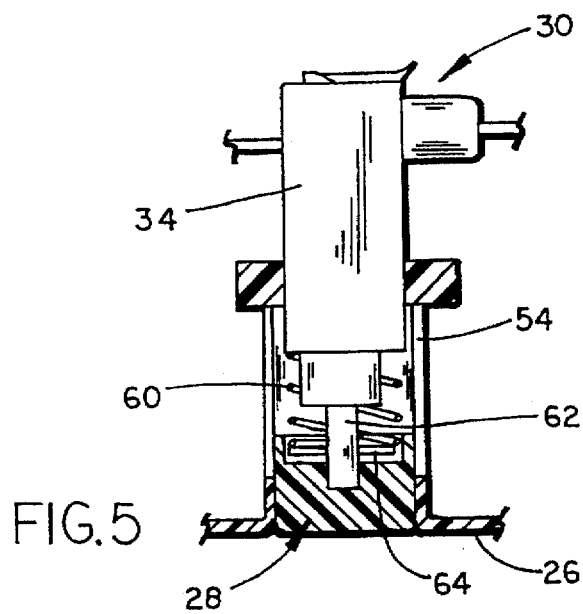

FIG. 4 is a cross-sectional view of the switch assembly taken along section lines IV—IV of FIG. 3;

FIG. 5 is a cross-sectional view of the switch assembly taken along section lines V—V of FIG. 3; and FIG. 6 is an enlarged fragmentary perspective exploded view of a modification of the switch mounting system embodying the present invention.

DETAILED DESCRIPTION OF THE PREFERRED EMBODIMENT

Figure 1:
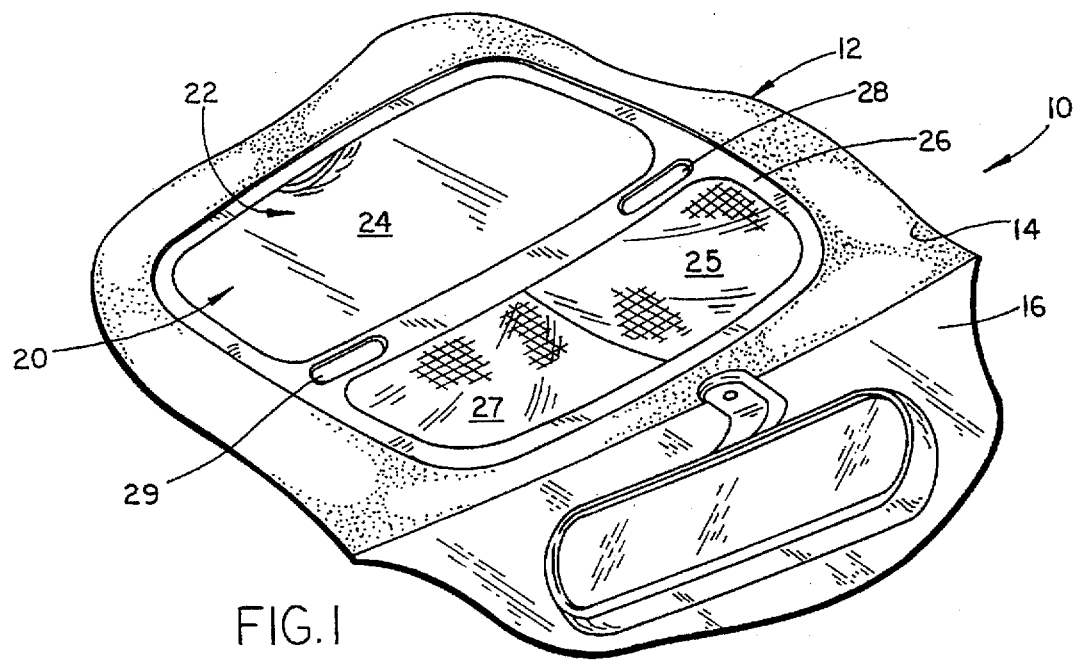
FIG. 1 is a fragmentary, perspective view of a vehicle embodying a switch mounting system of the present invention.

Referring initially to FIG. 1, there is shown a vehicle 10, such as an automobile, which includes a roof 12 having an integrated headliner system 14 made of a molded composite material which can be constructed in a conventional manner. Mounted to the headliner 14 and secured to the underlying sheet metal roof 12 adjacent front windshield 16 is a console 20 which includes a sunglass storage compartment 22 having a cover door 24 which is hinged to a housing 26 of the console 20 to allow access for storage of sunglasses therein. Forward of the sunglass storage compartment 22 is a pair of map reading lamp assemblies including a first lens 25 and a second lens 27 behind which there is positioned a bulb socket having a lamp therein which is electrically coupled to the vehicle's electrical operating system through a pair of electrical switches mounted according to the system of the present invention. One such switch 30 is shown in FIGS. 2–5 and is mounted behind the bezel 26 and includes an actuator button 28 which is operator accessible for actuating the lamp as desired. A second switch also includes an actuator button 29 extending through the bezel for actuation of the lamp behind lens 27.

Figure 2:
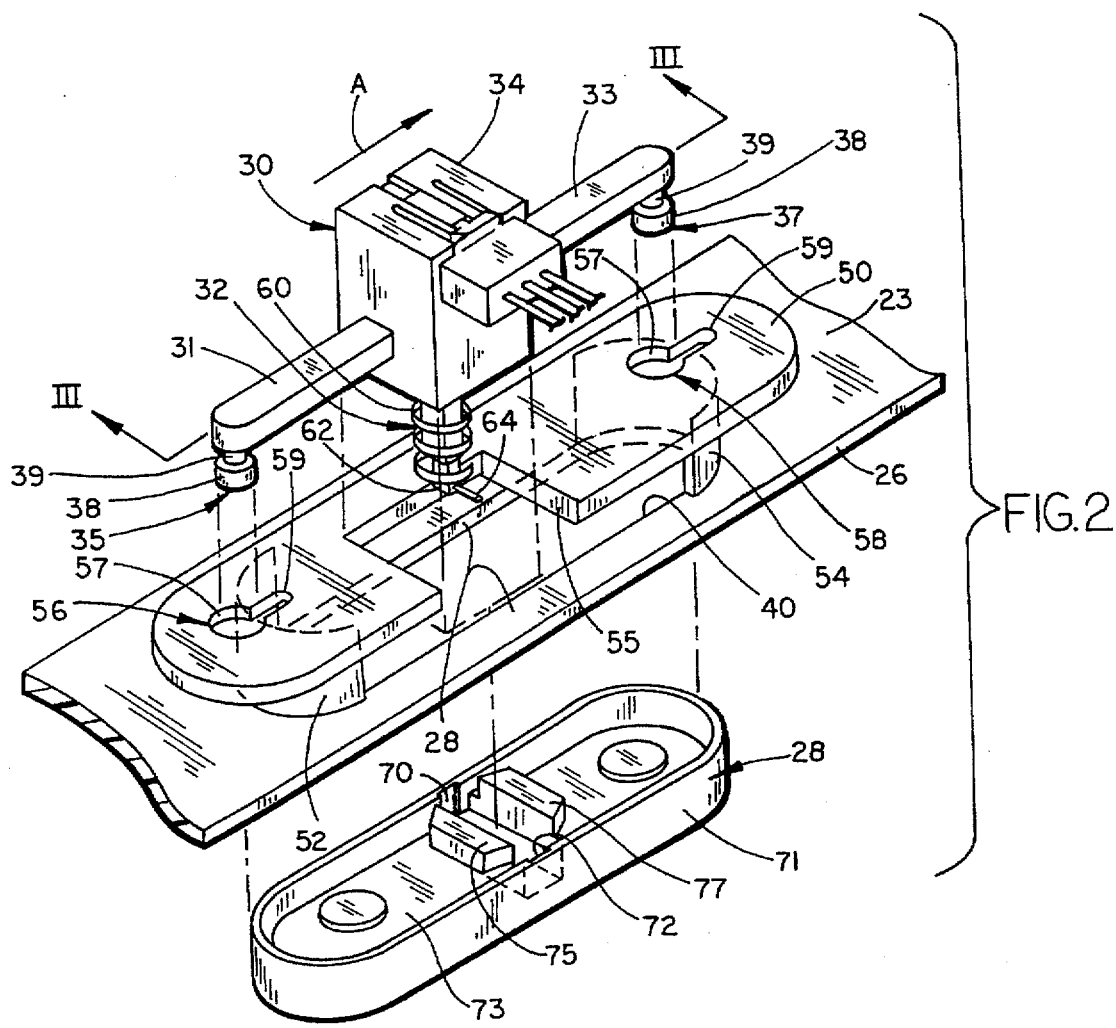
FIG. 2 is a greatly enlarged, fragmentary, perspective, exploded view of a switch mounting system embodying the present invention.

Turning now to FIG. 2, there is shown the switch mounting system of the present invention in which the rear surface 23 of bezel 26 is shown through which there is formed an oval aperture 40 for receiving the oval shaped push button 28. A mounting plate 50 is secured in spaced relationship above surface 23 of bezel 26 by a pair of curved end walls 52, 54 with mounting plate 50 including a generally rectangular central opening 55 for receiving the barrel 32 of switch 30 therethrough. On opposite sides of aperture 55 in mounting plate 50 are keyed apertures 56, 58, with each of the keyed apertures including a circular section 57 and a narrowed keyway 59 adjacent and communicating with section 57 and aligned on the same side of sections 57 for both apertures 56, 58. Thus, as seen in FIG. 2, the keyways 59 extend to the upper right from the enlarged, circular openings 57. Curved walls 52, 54 and mounting plate 50 can be integrally molded with the bezel 26 of the console housing. Any suitable polymeric material, such as polycarbonate, can be employed.

Switch 30 includes an internal operating mechanism which provides a single pole, double throw switch such that subsequent depressions of the switch either turn the lamp behind the associated lens off or on. The switch also provides connection of the lamp to the courtesy light circuit of the vehicle, such that when a vehicle door is opened the lamp is activated. The internal operating construction of the switch can generally be of the type disclosed in U.S. Pat. No. 5,145,059. The switch 30 includes a polymeric body 34 having a pair of arms 31, 33 extending laterally from opposite sides thereof and terminating in downwardly extending posts 35, 37, each of which has a circular head 38 with a diameter slightly smaller than that of section 57 of apertures 56, 58 through which the posts 35, 37 extend. Behind the circular disc-shaped heads 38 of posts 35, 37 and spaced slightly above the same are annular recesses 39 having a height corresponding to the thickness of plate 50 such that switch 30 can be installed by extending the heads 38 of posts 35, 37 through circular sections 57 and subsequently shifting the switch in a direction indicated by arrow A in FIG. 2, while holding the switch with the lower surface of arms 31, 33 against the upper surface of plate 50 to move the switch to an installed position. In this position, the grooves 39 extend within the narrowed slotted keyways 59 of plate 50. When in this position, the barrel 32 of switch 30 is centrally aligned with aperture 40 in bezel 26, and the barrel 32 extends through mounting plate 50 into the space between mounting plate 50 and the bezel surface 23, as best seen in FIG. 3.

Mounted to barrel 32 is a bias spring 60 which holds a switch actuator 62 in an extended position with respect to the body 34 of switch 30. For such purpose, a cross pin 64 extends through the end of the movable actuator and transversely to the longitudinal axis of the mounting plate 50 to align and snap fit within a pair of opposed slots 70, 72 formed on opposite sides of the sidewall 71 of actuator button 28 (FIG. 2). When the actuator button 28 is installed, as seen in FIG. 3, it is substantially flush with the outer surface of bezel 26 and is allowed to move freely within the generally oval shape housing end walls 52, 54 in an up-and-down direction as indicated by the two-headed arrow B in FIG. 3 for actuation of the switch 30. The inner floor surface 73 of actuator 28 includes a pair of spaced walls 75, 77 which snap over the actuator 62 and together with cross pin 64, which mates within slots 70 and 72 to snap-lock the actuator button 28 to the switch actuator 62. As can be appreciated, inasmuch as the shape of the actuator button 28 is oval having major and minor axes slightly smaller than aperture 40, when switch 30 is inserted in mounting plate 50 and shifted to the installed position, and actuator button 28 is subsequently snap locked onto plunger 62, switch 30 can no longer be shifted in a direction opposite arrow A in FIG. 2, thereby locking in the switch in the installed position preventing removal.

Thus, the switch 30 embodying the present invention is mountable to the console 20 without requiring additional fasteners by a method of inserting the switch into keyed apertures, shifting the switch into an installed position and subsequently snap locking the switch actuating button in place. This system, therefore, eliminates the need for additional fasteners or fastening steps during the assembly of a switch to a vehicle and, thereby, provides a significant cost reduction to the resultant installation.

It will be appreciated by those skilled in the art that the switch body 34 may itself have a configuration which keys the switch body to a keyed aperture in mounting plate 50 such that the subsequent cooperation of the actuator button with the switch actuating barrel provides the lock-in, installed position for the resultant switch. Also, the switch may include the keyed aperture(s) with the cooperating post(s) on the mounting plate. This embodiment is shown in drawing FIG. 6, where the mounting posts 35', 37' are mounted on the switch mounting plate 50 and the keyed apertures 56', 58' are formed in the arms 31', 33' of the switch 30. These and other modifications to the preferred embodiment as disclosed herein can be made by those skilled in the art without departing from the spirit or scope of the inventive as defined by the appended claims.

The embodiments of the invention in which an exclusive property or privilege is claimed are defined as follows:

1. A map lamp console for a vehicle comprising:
   a lamp housing for receiving a lamp and a push-button actuated switch for supplying operating power to the lamp, said housing including a bezel having an aperture therethrough for receiving a switch actuating button;
   a mounting plate positioned on said housing behind said bezel and including a keyed aperture;
   a push-button switch including a mounting post for mounting said switch to said mounting plate, said switch including an actuator positioned in aligned relationship with said aperture in said bezel when said switch is mounted to said mounting plate; and
   a switch actuator button extending through said aperture in said bezel and engaging said switch actuator for locking said switch in an installed position.

2. The map lamp console as defined in claim 1 wherein said post extends from said switch.

3. The map lamp console as defined in claim 2 wherein said switch body includes a pair of arms each having posts extending outwardly therefrom toward said mounting plate and wherein said mounting plate includes a pair of aligned spaced keyways formed therein for receiving said posts.

4. The map lamp console as defined in claim 3 wherein said actuator button snaps onto said actuator of said switch.

5. The map lamp console as defined in claim 4 wherein said aperture in said bezel comprises an oval aperture and said actuator button comprises an oval button having major and minor dimensions slightly smaller than the dimensions of said aperture in said bezel so as to be freely movable therethrough.

6. A map lamp and switch comprising:
   a switch having a body and a movable actuator extending therefrom, said body having a mounting post;
   a map lamp housing to which said switch is mounted, said housing including a keyed aperture for attaching said switch to said housing, said housing further including an opening for said actuator and aligned in predetermined relationship with said actuator when said switch is attached to said housing and a lamp coupled to said switch; and
   an actuator button shaped to extend through said opening in said housing and engage said actuator to prevent shifting of said switch body with respect to said housing and thereby lock said switch in place.

7. The map lamp and switch as defined in claim 6 wherein said actuator button snap-fits onto said actuator.

8. The map lamp and switch as defined in claim 7 wherein said switch body defines a mounting post and said housing includes said keyed aperture.

9. The map lamp and switch as defined in claim 8 wherein said switch body includes a pair of arms extending outwardly therefrom and each of said arms includes a mounting post.

10. The map lamp and switch as defined in claim 9 wherein said mounting post includes a disc-shaped head and an annular recess under said head.

11. The map lamp and switch as defined in claim 10 wherein said housing includes a mounting plate and a bezel spaced from said mounting plate, and wherein said mounting plate includes said keyway and said bezel includes said opening.

12. The map lamp and switch as defined in claim 11 wherein said opening is oval.

13. The map lamp and switch as defined in claim 12 wherein said switch is a push-button switch.

14. The map lamp and switch as defined in claim 13 wherein said actuator button is oval to fit within said oval opening in said bezel.

15. A map lamp and switch for a vehicle comprising:

a map lamp housing for receiving a push-button actuated switch, said housing including a bezel having an aperture therethrough for receiving a push-button switch actuating button;

a mounting plate positioned on said housing behind said bezel and including a keyed aperture for receiving a mounting post;

a switch including a mounting post extending through said keyed aperture and shiftable for moving the switch from a preliminary position to a final, installed position in which said post extends through a narrow portion of said keyed aperture and the switch actuator extends in aligned relationship through said aperture in said bezel; and a switch actuator button extending through said aperture in said bezel and engaging said switch actuator for locking said switch in an installed position.

16. The map lamp and switch as defined in claim 15 wherein said mounting post comprises a member extending from a body portion of said switch.

17. The map lamp and switch as defined in claim 16 wherein said switch body includes a pair of arms each having mounting posts extending outwardly therefrom toward said mounting plate and wherein said mounting plate includes a pair of aligned spaced keyed apertures formed therein for receiving said posts.

18. The map lamp and switch as defined in claim 17 wherein said aperture in said bezel comprises an oval aperture and said actuator button comprises an oval button having major and minor dimensions slightly smaller than the dimensions of said oval aperture in said bezel so as to be freely movable therethrough.

19. The map lamp and switch as defined in claim 18 wherein said switch is a single pole, double throw switch.

20. A map lamp console for a vehicle comprising:

a lamp housing for receiving a lamp and a push-button actuated switch for supplying operating power to the lamp, said housing including a bezel having an aperture therethrough for receiving a switch actuating button;

a mounting plate positioned on said housing behind said bezel and including a mounting post;

a push-button switch including a keyed aperture for mounting said switch to said mounting plate, said switch including an actuator positioned in aligned relationship with said aperture in said bezel when said switch is mounted to said mounting plate; and a switch actuator button extending through said aperture in said bezel and engaging said switch actuator for locking said switch in an installed position.

21. The map lamp console as defined in claim 20 wherein said post extends from said mounting plate.

22. The map lamp console as defined in claim 21 wherein said switch body includes a pair of arms each having posts extending outwardly therefrom toward said mounting plate and wherein said mounting plate includes a pair of aligned spaced keyways formed therein for receiving said posts.

23. The map lamp console as defined in claim 22 wherein said actuator button snaps onto said actuator of said switch.

24. The map lamp console as defined in claim 23 wherein said aperture in said bezel comprises an oval aperture and said actuator button comprises an oval button having major and minor dimensions slightly smaller than the dimensions of said aperture in said bezel so as to be freely movable therethrough.

25. A map lamp and switch comprising:

a switch having a body and a movable actuator extending therefrom, said body having a keyed aperture;

a map lamp housing to which said switch is mounted, said housing including a mounting post for attaching said switch to said housing, said housing further including an opening for said actuator and aligned in predetermined relationship with said actuator when said switch is attached to said housing and a lamp coupled to said switch; and an actuator button shaped to extend through said opening in said housing and engage said actuator to prevent shifting of said switch body with respect to said housing and thereby lock said switch in place.

26. The map lamp and switch as defined in claim 25 wherein said actuator button snap-fits onto said actuator.

27. The map lamp and switch as defined in claim 26 wherein said switch body defines a keyed aperture and said housing includes said mounting post.

28. The map lamp and switch as defined in claim 27 wherein said switch body includes a pair of arms extending outwardly therefrom and each of said arms includes a mounting post.

29. The map lamp and switch as defined in claim 28 wherein said mounting post includes a disc-shaped head and an annular recess under said head.

30. The map lamp and switch as defined in claim 29 wherein said housing includes a mounting plate and a bezel spaced from said mounting plate, and wherein said mounting plate includes said keyway and said bezel includes said opening.

31. The map lamp and switch as defined in claim 30 wherein said opening is oval.

32. The map lamp and switch as defined in claim 31 wherein said switch is a push-button switch.

33. The map lamp and switch as defined in claim 32 wherein said actuator button is oval to fit within said oval opening in said bezel.

* * * * *